Jan. 29, 1929.
T. BAUER
1,700,303
MEANS FOR AND METHOD OF FORMING GUM
Filed Sept. 24, 1925 — 4 Sheets-Sheet 1
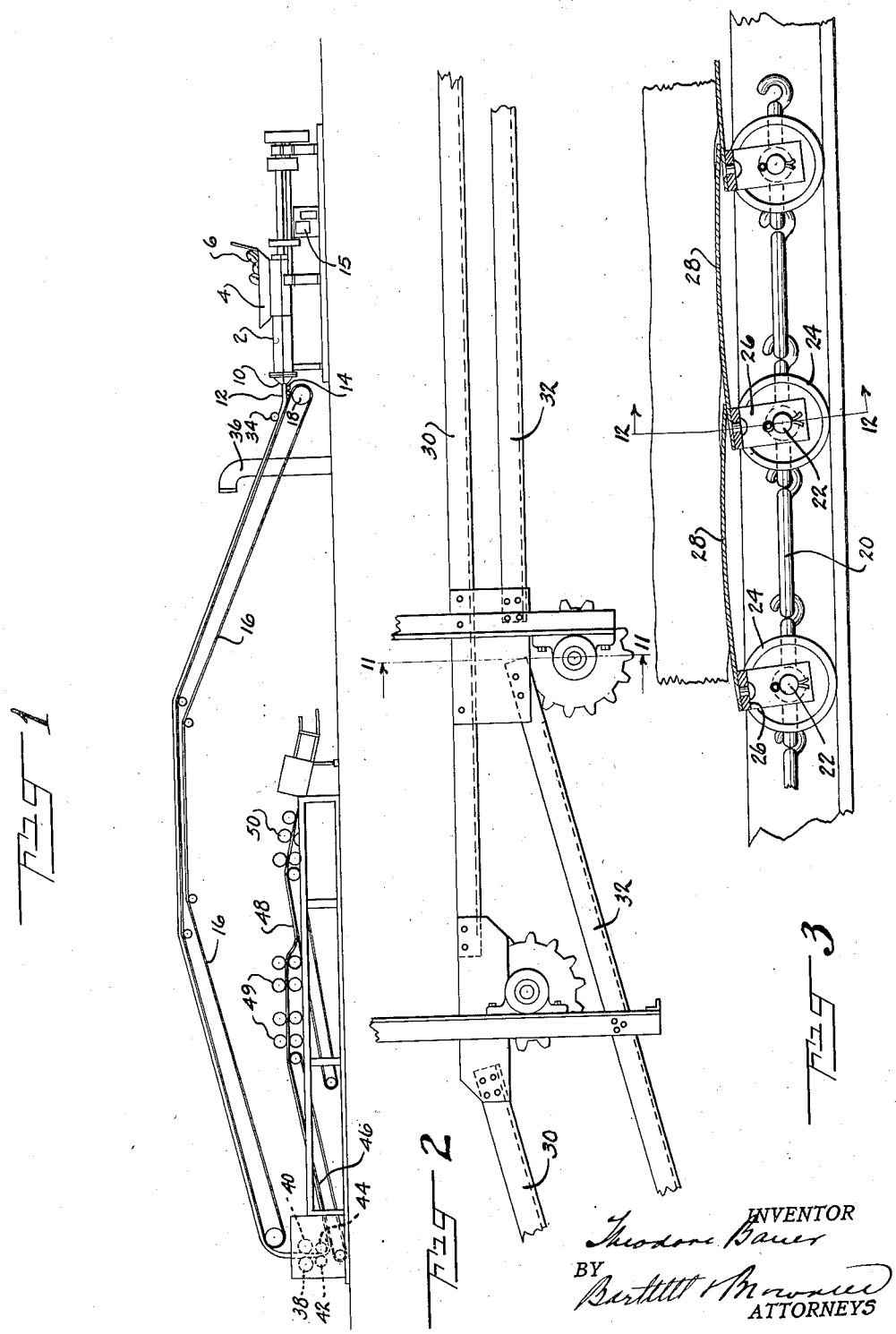
INVENTOR
Theodore Bauer
BY
ATTORNEYS

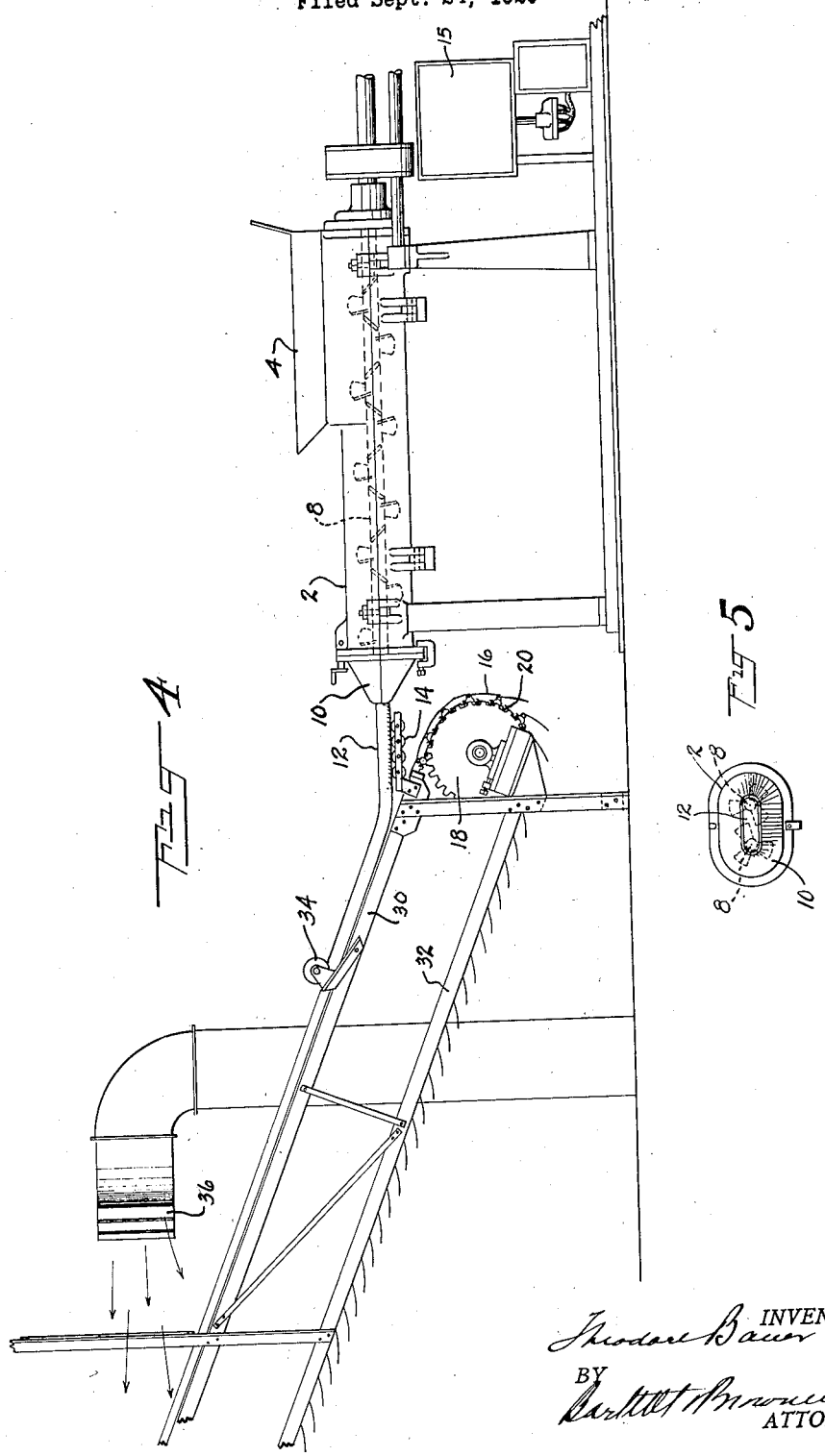

Jan. 29, 1929.
T. BAUER
1,700,303
MEANS FOR AND METHOD OF FORMING GUM
Filed Sept. 24, 1925    4 Sheets-Sheet 3
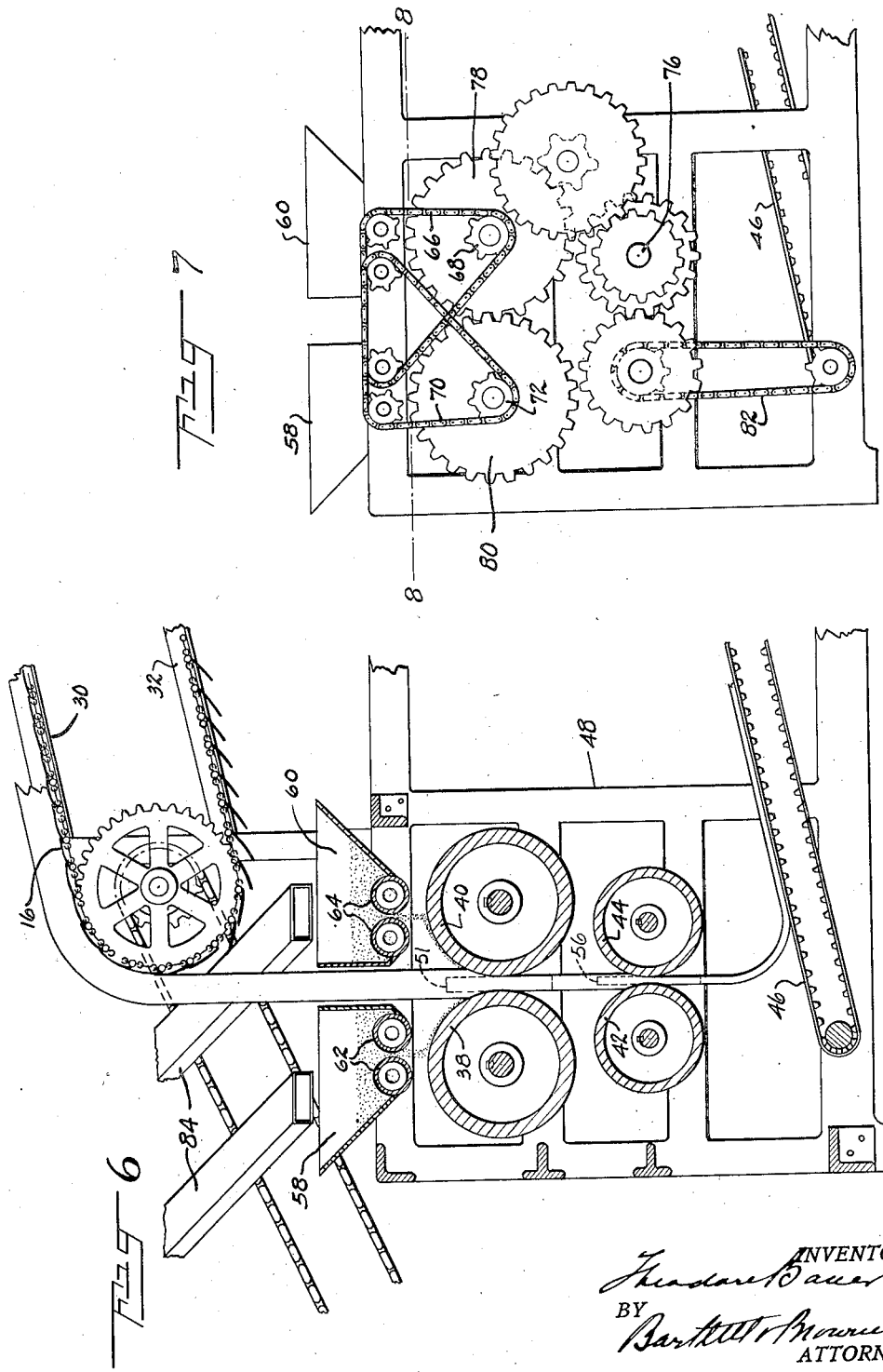
INVENTOR
Theodore Bauer
BY
Bartlett & Brownell
ATTORNEYS Jan. 29, 1929.
T. BAUER
1,700,303
MEANS FOR AND METHOD OF FORMING GUM
Filed Sept. 24, 1925    4 Sheets-Sheet 4
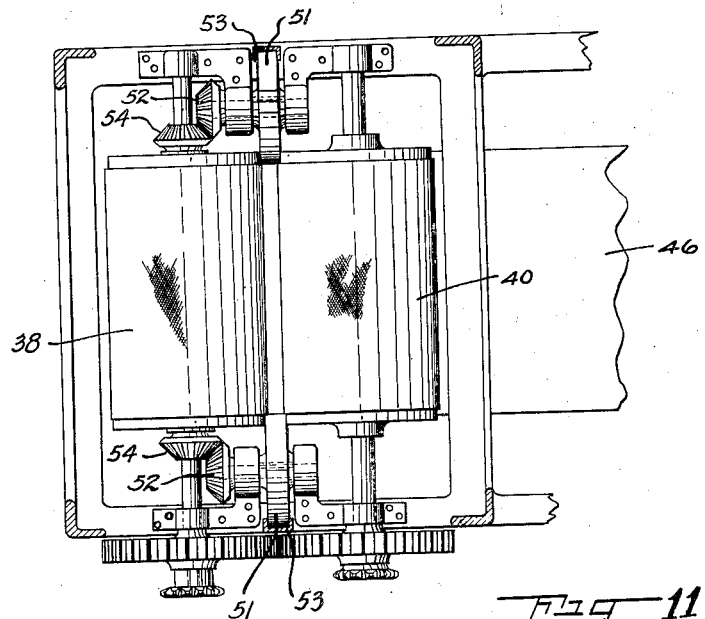
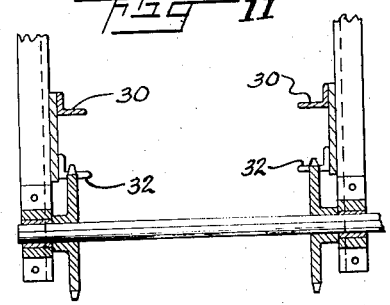
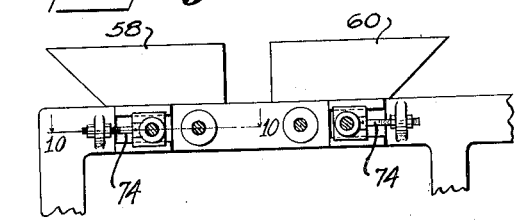
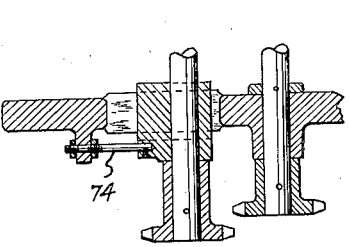
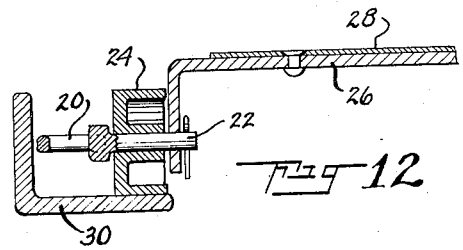
INVENTOR
Theodore Bauer
BY
ATTORNEYS Patented Jan. 29, 1929.

1,700,303

UNITED STATES PATENT OFFICE.

THEODORE BAUER, OF CANAJOHARIE, NEW YORK, ASSIGNOR TO BEECH-NUT PACKING COMPANY, OF CANAJOHARIE, NEW YORK, A CORPORATION OF NEW YORK.

MEANS FOR AND METHOD OF FORMING GUM.

Application filed September 24, 1925. Serial No. 58,263.

My invention relates to a new and improved means for and method of forming uncured gum, particularly chewing gum, into a continuous sheet of the desired thickness, and has for its object to produce a continuous method and means for carrying it out, to reduce the manual labor necessary heretofore for producing the same ultimate product; to reduce the handling of the gum by the workmen; and to increase the output and produce a more uniform product.

Heretofore the practice has been to introduce lumps of uncured gum into an extrusion machine which discharges the same in a thick, flattened mass. Portions of the mass as it was extruded have heretofore been cut up in portions about the size of small loaves of bread and placed on trays in racks, where it was allowed to cure or set sufficiently to enable it to be rolled. This cutting operation was a manual operation. After the loaves were cured they were then taken by hand and introduced into the hopper of a machine containing rollers between which the gum was forced, which rollers delivered it in the form of a comparatively thin sheet. It was delivered by this rolling apparatus to a further mechanism, containing rollers which further reduced its thickness and severed it into sheets of the desired size.

By my invention the gum is cured without reducing it to loaf form.

The following is a description of an embodiment of my invention, reference being had to the accompanying drawings, in which:

Figure 1 shows diagrammatically an apparatus embodying my mechanism and carrying out my improved process;

Fig. 2 is a detail view showing a portion of a conveyor employed in my improved apparatus;

Fig. 3 is a vertical section of a portion of said conveyor;

Fig. 4 is an enlarged detail view showing in side elevation an extrusion apparatus and portions adjacent thereto;

Fig. 5 is a detail view showing the discharge mouth of the extrusion device;

Fig. 6 is an enlarged view, partly in section, of the other end of my apparatus showing the reducing rolls and the supporting frame therefor;

Fig. 7 is an end view of the reducing roll mechanism;

Fig. 8 is a section on the line 8—8 of Fig. 7;

Fig. 9 is a sectional view showing means for adjusting one of the delivery rolls in each of the two sugar delivering hoppers;

Fig. 10 is a section on the line 10—10, Fig. 9;

Fig. 11 shows a sectional detail on the line 11—11, Fig. 2;

Fig. 12 shows a sectional detail on the line 12—12, Fig. 3.

Referring more particularly to the drawings, 2 is an extrusion device of the ordinary type, except preferably a little elongated, having the usual hopper 4 into which lumps of gum 6 are placed. This hopper is provided with two shafts 8, having paddles thereon, which act to knead the gum and force it toward the lips 10 of the delivery mouth from which it is delivered in the form of a thick, flattened mass, as shown at 12, on to a series of supporting rolls 14. The extrusion device is preferably driven by an electric motor, not shown, its speed being controlled by a speed controller indicated at 15. Adjacent to these supporting rolls is a curing conveyor belt 16 mounted upon a sprocket wheel 18, which conveyor belt consists of a pair of sprocket chains 20, every other link of which is provided with a pin 22 upon which is mounted a roller 24. Upon each pin is mounted a U-shaped member 26, carrying a leaf 28, the leaves overlapping, as shown in Fig. 3. The U-shaped members are free to rotate upon the pins 22 adjacent to the forward edge so that they drop away from one another when on the lower side of the conveyor, as shown in Figs. 4 and 6, and close down upon one end when on the upper side of the conveyor, as shown in Fig. 2. This results in forming a flexible self-cleansing conveyor and aids in discharging the gum from the delivery end of the conveyor. The conveyor belt is supported by a frame having two tracks 30 and 32 upon which the rollers 24 rest. These tracks are formed of angle irons, as shown in Fig. 11. The tracks at the receiving end of the conveyor are inclined upwardly, as shown in Figs. 1 and 4, and then have a horizontal portion, as shown in Fig. 1, and then a descending portion, as shown in Figs. 1 and 6. Adjacent to the receiving end of the curing conveyor is a compacting roll 34 mounted in suitable bearings carried by the conveyor frame and engaging the upper surface of the gum and driven thereby so as to compact the mass, spreading the same slightly and reducing its thickness. Adjacent to this roller is an air blast 36 delivering dehydrated air upon the surface of the mass supported by the curing conveyor so as to remove some of the moisture therefrom and accelerate the curing or setting of the mass.

The curing conveyor moves in timed relation with the extrusion device 2 so as to take up the gum as fast as it is delivered, and is of such length, that the gum as it is carried along by the conveyor is cured so that when it reaches the delivery end of the conveyor it is cured sufficiently for rolling.

When the mass of gum reaches the delivery end of the curing conveyor it is discharged in a vertical direction, as shown in Fig. 6, and passes between two reducing rolls 38 and 40 which deliver it to two other reducing rolls 42 and 44 which in turn deliver it to the conveyor 46 of an apparatus 48 which contains sets of rolls 49 for reducing it to the final desired thickness and at 50 cutting it up into sheets of desired length. The apparatus for producing this final thickness and severing is preferably that described and shown in application Serial No. 40,189, filed by B. S. Penley, June 29, 1925. (Patent No. 1,573,120, dated February 16, 1926). The rolling mechanism which receives the gum in sheet form directly from the conveyor is provided with edge contacting rolls 51 which are driven by gears 52 and 54, the gears 54 being rigidly mounted upon the shaft of the roller 38. Similar edge contacting rollers similarly driven are located between the rollers 42 and 44, as shown in dots at 56. 53 are scrapers for the rolls 51.

Mounted above the rollers 38 and 40 are two hoppers 58 and 60 provided in their bottoms with delivery rolls 62 and 64, discharging powdered sugar upon the tops of the rolls 38 and 40 which powdered sugar comes between the mass of gum and the knurled surfaces of those rolls so as to prevent the gum from adhering thereto. Enough of this sugar adheres to the mass so that it is prevented from adhering to the rolls 42 and 44. Thus, two of the rolls 62 and 64 are driven by a sprocket chain 66 which is driven by a sprocket wheel 68 on the shaft of the roller 40, while the other two are driven by a sprocket chain 70 driven by the sprocket wheel 72 on the shaft of the roller 38. The powdered sugar delivery rolls can be adjusted laterally by the adjusting means 74, shown in Figs. 9 and 10, so as to vary the amount of sugar discharged from a hopper. The rolling mechanism is provided with a drive shaft 76 driven by a pulley (not shown), which is directly connected to the roll 44 and geared to the roll 42, so that the rolls 42 and 44 revolve at equal rates, and is connected by reducing gearing to the equal gears 78 and 80 connected to the rolls 38 and 40, so as to drive those rolls at a reduced speed. The conveyor 46 is driven in timed relation from the shaft of the roller 42 by a sprocket chain 82. 84 are chutes for delivering powdered sugar to the hoppers 58 and 60. The mechanism 48 being driven in timed relation with all the other parts, receives the gum as fast as it is delivered to it and further reduces it in thickness and discharges it in the desired sheets for subsequent processes.

In the operation of the apparatus a sufficient supply of lump of gum is kept in the hopper of the extrusion machine which extrudes it in a continuous mass, which is delivered to the rollers 14 and thence to the curing conveyor. It is then slightly compacted and spread by the roller 34 and subjected to the dehydrated air from the air blast 36. The curing conveyor is of such linear extent and moves at such a rate that when the gum reaches its delivery end it is cured and ready for rolling. It is then rolled, its edges being compacted laterally by the rolls 51 adjacent to and preferably between the ends of the reducing rolls and later rerolled and cut into sheets. The central portion of the conveyor is elevated so as to be located in the upper part of the room where the apparatus is operated so that the gum is, while on the conveyor, carried from air of one temperature to air of a higher temperature and the space beneath is ample for the rerolling mechanism. In this way a continuous process is carried out with the advantages sought as above set forth.

As will be evident to those skilled in the art, my invention permits various modifications without departing from the spirit thereof or the scope of the appended claims.

What I claim is:

1. In a gum forming apparatus an extended conveyor and means for delivering a thick flattened mass of gum thereto, means for rolling the mass as delivered therefrom, the conveyor being of such length as to permit the gum thereon to be substantially cured for rolling before delivery thereby, said conveyor having an elevated portion, and means beneath said conveyor for reducing said sheet to its final thinness.

2. The improvement in treating gum which consists in continuously extruding gum in the form of a thick flattened mass, conveying the same slowly until it is substantially cured, discharging it in a vertical plane and rolling the same while in said vertical plane so as to reduce its thickness.

3. The improvement in treating gum which consists in continuously extruding gum in the form of a thick flattened mass, conveying the same slowly upwardly and until it is substantially cured, and then delivering the conveyed gum in a vertical plane and rolling the same while in said vertical plane to reduce its thickness.

In testimony whereof, I have signed my name to this specification this 22nd day of September, 1925.

THEODORE BAUER.